United States Patent [19]

Jarzombek et al.

[11] Patent Number: 4,920,199

[45] Date of Patent: Apr. 24, 1990

[54] WATER-REDUCIBLE COATING COMPOSITION

[75] Inventors: Richard E. Jarzombek, Munster; Raymond J. Moeller, Jr., Cedar Lake, both of Ind.; Merrill L. Pruitt, Lansing, Ill.

[73] Assignee: Bee Chemical Company, Lansing, Ill.

[21] Appl. No.: 269,824

[22] Filed: Nov. 10, 1988

[51] Int. Cl.$^5$ .............................................. C08G 63/02
[52] U.S. Cl. .................... 528/272; 528/259; 528/288; 524/376; 524/378; 524/385; 524/597; 524/604; 524/608; 524/755; 524/765
[58] Field of Search ........ 528/272, 288, 259; 524/376, 378, 385, 597, 604, 755, 765, 608

[56] References Cited

U.S. PATENT DOCUMENTS

| | | | |
|---|---|---|---|
| 2,270,662 | 1/1939 | Raney | 428/160 |
| 3,025,252 | 3/1962 | Jack | 522/200 |
| 3,873,518 | 3/1975 | Strange et al. | 536/91 |
| 3,988,160 | 10/1976 | Trexel | 106/1.12 |
| 4,049,607 | 9/1977 | Berghoff | 524/376 |
| 4,062,821 | 12/1977 | Haag et al. | 524/377 |
| 4,129,547 | 12/1978 | Noyes | 528/259 |
| 4,153,592 | 5/1979 | Burroway et al. | 524/317 |
| 4,218,355 | 10/1980 | Chang et al. | 524/297 |
| 4,294,738 | 10/1981 | Beresniewicz | 524/167 |
| 4,411,951 | 10/1983 | Barsotti | 428/328 |
| 4,530,958 | 7/1985 | Kasari et al. | 524/512 |

*Primary Examiner*—John Kight
*Assistant Examiner*—Sam A. Acquah
*Attorney, Agent, or Firm*—Wayne E. Nacker; Gerald K. White

[57] ABSTRACT

Coating compositions comprise a clear, homogeneous binder mixture of polyether or polyester polymer, an amine-formaldehyde condensate resin, and an organic solvent; the mixture being miscible with water to application viscosity. The coating composition typically contains suspended solid particulates, including pigments and metal flakes.

24 Claims, No Drawings

WATER-REDUCIBLE COATING COMPOSITION

The present invention is directed to coating compositions which may contain no water but which are reducible by water at the site of application.

BACKGROUND OF THE INVENTION

Due to increasing environmental concerns there exists a need for coatings with low solvent emissions. A growing number of states are placing restrictions on the relative amounts of emitted solvents permitted for various types of coating applications. A VOC (volatile organic content) of less than 2.0 pounds per gallon of product, as applied, is desirable to meet the most demanding restrictions for solvent-containing coatings. It has proven very difficult to apply a solvent-containing coating at VOC levels of 2.0 pounds per gallon or less and still achieve acceptable appearance in a decorative coating. This is especially true of polychromatic coatings, such as automotive body finishes.

Water-based coatings can satisfy most VOC requirements. However, water-based coatings are unsuitable for certain purposes. In particular, water-based coatings cannot be used to supply a stable coating containing a water-reactive metal, such as aluminum.

Water-reducible, solvent-containing coatings have been proposed having a binder system comprising an acrylic polymer having amine-neutralized carboxyl groups plus an amine-formaldehyde resin cross-linking agent. Such compositions are described, for example, in U.S. Pat. No. 4,530,958, the teachings of which are incorporated herein by reference. Although such compositions have worked well for many coating applications, high viscosities of such compositions have made it difficult to apply these compositions at high solids levels. Polymers achieving water solubility through amine neutralization of their carboxyl groups yield relatively high viscosity in water compared to their viscosity in organic solvents.

There exists a continued need for water-reducible coatings which provide low VOC's and which may be applied at high solids levels.

SUMMARY OF THE INVENTION

In accordance with the invention, a clear, homogeneous coating mixture comprises: (A) from about 25 to about 95 wt. percent of a polymer which is a polyether or polyester; (B) between about 2.5 and about 50 wt. percent of an amine-formaldehyde cross-linking resin; and (C) up to about 50 wt percent of an organic solvent. The polymer, amine-formaldehyde resin and organic solvent are mutually compatible, forming a clear, homogeneous mixture when mixed in these proportions. The binder mixture is formulated so as to be sufficiently compatible with a volume of water equal to at least about one fifth the total volume of the coating binder mixture ((A)+(B)+(C)) and with sufficient additional water to achieve a thinned viscosity of less than about 250 cps so as to remain a clear, homogeneous mixture, whereby the coating composition may be reduced with water at the site of application. The polymer is substantially non-ionic, having an acid number below about 15. The polymer has terminal and/or pendant hydroxyl groups sufficient to provide a hydroxyl value of between about 100 and about 1000.

DETAILED DESCRIPTION OF CERTAIN PREFERRED EMBODIMENTS

Coating compositions in accordance with the invention have a binder which is a clear, homogeneous mixture of: (A) a generally non-ionic hydroxyl group-containing polyether or polyester polymer; (B) an amine-formaldehyde resin; and, optionally, (C) an organic solvent The polymer, amine-formaldehyde resin and organic solvent are selected for mutual compatibility so that, in combination, these components form a clear, homogeneous mixture The polymer, amine-formaldehyde resin, and organic solvent are further selected so that the clear, homogeneous mixture of these components is sufficiently compatible with a volume of water equal to at least about one fifth the total volume of the coating binder mixture ((A)+(B)+(C)) and with sufficient additional water to achieve a thinned viscosity of less than about 250 cps (as measured on a Brookfield viscometer at 25° C.) so as to remain a clear, homogeneous mixture. This is not to say that each of these individual components, e.g., the polymer, is fully miscible in water, but only that each of these components be sufficiently miscible with or tolerant of water that these components in combination form a clear, homogeneous mixture which remains a clear, homogeneous mixture when thinned with water.

The binder mixture's considerable compatibility with water makes coating compositions in accordance with the invention reducible with water. The binder mixture may, thereby, be mixed with concentrated levels of solid materials, such as pigments and metal particulates, which contribute to the appearance of the coating and b ®reduced with water at the point of application providing a reduced coating composition which has a relatively low proportion of volatile organic solvents.

Water reducibility of coating compositions of the present invention is also advantageous with respect to providing shelf-stable metallic coatings. Metallic coatings generally contain metal flakes in addition to pigments. Many metal flakes are reactive with water; this is particularly true of commonly used aluminum flakes. Coating compositions in accordance with the present invention are formulated so that they may be prepared, stored, and shipped without any water and then reduced with water at the point of application. Aluminum and other water-reactive metal flakes may be included in compositions according to this invention without problems of fuming or instability. Absence of water from the stored and shipped compositions also avoids corrosion of containers and degradation of pigments and resins, e.g., by hydrolysis and deesterification. Coating compositions in accordance with the invention have the dual advantages of being water-free until used while being water-reducible to minimize solvent emissions at the point of application.

There are a number of advantages to shipping and storing compositions according to this invention without the inclusion of any water. However, the invention is intended to cover binder mixtures and coating compositions which are pre-thinned with water.

The solids of the binder mixture comprise the polymer (A) and the amine-formaldehyde resin (B). The polymer has functional groups. Particularly hydroxyl groups, by which the polymer may be cress-linked. The amine-formaldehyde resin serves as a cross-linker for the polymer, whereby, when the coating composition is applied to a surface the solids of the binder mixture cure into a cross-linked network. The polymer (A) comprises between about 50 and about 95 wt. percent of the binder mixture solids (polymer plus amine-formaldehyde resin); the amine-formaldehyde resin (B) comprises between about 5 and about 50 wt. percent of the binder mixture solids. Together these binder mixture solids comprise from about 50 to 100 wt. percent of the binder mixture.

If the polymer (A) and the amine-formaldehyde resin (B), together, provide a clear, homogeneous mixture which is of sufficiently low viscosity, organic solvent (C) is not required. However, an organic solvent may be necessary to provide a clear, homogeneous mixture of the polymer and the amine-formaldehyde resin. Also, organic solvents generally tend to reduce the viscosity of the binder mixture. For the purpose of the invention, it is preferred that the binder mixture have a viscosity, as measured on a Brookfield viscometer at 25° C., of 20,000 cps or less, and more Preferably, of 10,000 cps or less.

The polymer in accordance with the present invention is selected for water tolerance. It is preferred that the polymer be completely soluble with water; however, it is sufficient that the polymer in the presence of the amine-formaldehyde resin and any organic solvent be sufficiently compatible with a volume of water equal to at least about one fifth the total volume of the coating binder mixture ((A)+(B)+(C)) and with sufficient additional water to achieve a thinned viscosity of less than about 250 cps so as to remain a clear, homogeneous mixture, i.e., without phase separation. The polymer is also selected for relatively low viscosity, whereby the viscosities of the binder mixture set forth above may be achieved. Consistent with low viscosities, polymers most useful for the binder mixtures have molecular weights (number average) of less than about 2000. Very low. e.g., less than about 300, molecular weight polymers may have a vapor pressure that is sufficiently high to result in fuming problems in certain applications. It is preferred, therefore, that polymers used in the binder mixture have molecular weights (number average) above about 500. High molecular weight polymers tend to significantly increase the viscosity of the binder mixture and are, therefore, undesirable for many coating applications, particularly where the coating composition is to be applied by a spray form Of course, a small portion of the polymer molecules may be outside the molecular weight ranges without causing significant problems with respect to either fuming or high viscosity.

Polymers in accordance with the invention have substantial hydroxyl functionality, polymers having hydroxyl values in about the 100 to 1000 range being used. Preferably, the hydroxyl value of the polymer is in the range of about 100 to about 600, a hydroxyl value of about 200 being considered optimal at the present time. Hydroxyl functionality on the polymer may be terminal and/or pendant to the polymer chain. Preferably, the polymer has terminal hydroxyl functionality; however, polymers with only pendant hydroxyl functionality are useful, providing the polymer is sufficiently tolerant of or miscible with water. If a mixture of polymers is used, the hydroxyl value of the polymer mixture is in the above-recited range.

Polymers useful for the binder solution are generally non-ionic, but may have a small degree of acidic, i.e., carboxyl, functionality. Consistent with good water solubility, the polymer (or mixture of polymers) should have acid numbers of below about 15. Some acid functionality, however, may promote adhesion to certain surfaces. Carboxyl functionality may be provided to an hydroxyl group-containing polymer, for example, by esterification with a dicarboxylic acid or its anhydride. These types of polymers are distinguished from acrylic polymers used in prior art compositions which are partially or fully neutralized by amines polymers used in the binder solutions of the present invention are sufficiently later compatible without any amine neutralization. The substantially non-ionic character of the polymer helps to ensure that the viscosity of the coating compositions is lowered, rather than raised, by the addition of water at the point of application. This is in contrast to compositions based upon amine-neutralized polyacrylates which tend to thicken or gel in the presence of water.

Types of polymers useful in accordance with the invention include polyhydroxy polyethers, polyhydroxy polyesters and mixtures thereof. Polyhydroxy Polyether polymers (functionality of 2 or more) result from the reaction of organic oxides (typically ethylene oxide, propylene oxide. butylene oxide, etc. or mixtures thereof) with polyfunctional substances such as water, ethylene glycol, propylene glycol, neopentyl glycol, butylene glycol, 1,4-butanediol, hexylene glycol, 1,6-hexanediol, the polyglycols such as diethylene glycol or triethylene glycol, etc., the triols such as glycerine, trimethylol ethane, trimethylol propane, etc. and other higher functional alcohols such as pentaerythritol, sorbitol, mannitol, and the like. Polyhydroxy polyester polymers (functionality of 2 or more) result from the reaction of polycarboxylic acids or anhydrides (typically isophthalic acid, phthalic acid or anhydride, maleic acid or anhydride, fumaric acid, sebacic acid, azelaic acid, adipic acid, trimellitic acid or anhydride, etc.) with polyhydroxy substances such as ethylene glycol, propylene glycol, neopentyl glycol, butylene glycol, 1,4-butanediol, hexylene glycol, 1,6-hexanediol, the polyglycols such as diethylene glycol or triethylene glycol, etc., the triols such as glycerine, trimetylol ethane, trimethylol propane, etc. and other higher functional alcohols such as pentaerythritol, sorbitol, mannitol, and the like.

Types of amine-formaldehyde resins useful in accordance with the present invention include urea-formaldehyde resins, melamine-formaldehyde resins, and mixtures thereof. Melamine-formaldehyde resins are generally preferred to urea-formaldehyde resins from the standpoint of providing the coating composition with good weatherability. Useful resins according to the invention may include urea and/or a wide variety of melamines, including, but not limited to, di-, tri-, tetra-, penta-. and hexamethylol melamine, alkoxy ($C_{1-5}$) methyl melamine, melamine having a methylol group and alkoxy group ($C_{1-5}$), and urea-melamine copolycondensate. A preferred resin is hexamethoxymethyl melamine.

Solvents are selected for enhancing miscibility of the binder solution components with each other and with water and also for the purpose of lowering viscosity. Suitable solvents include but are not limited to methanol, ethanol, propanol, isopropanol, ethylene glycol-monomethyl ether, ethylene glycol-monoethyl ether, ethylene glycol monoisopropyl ether, ethylene glycol monobutyl ether, diethylene glycol monomethyl ether, diethylene glycol monoethyl ether, diethylene glycol monopropyl ether, diethylene glycol monobutyl ether, acetone, etc.

In addition to the binder mixture, coating compositions in accordance with the present invention typically contain solid materials, such as pigments and metallic flakes. Types of useful metallic flakes include, but are not limited to, aluminum, copper, brass, micaceous iron oxide, bronze, and stainless steel. An important aspect of the invention is that the coating compositions may be entirely free of water until reduced at the site of application. The absence of water substantially enhances the stability of coating compositions containing water-reactive metal flakes. The absence of water also avoids water degradation of other solid pigment materials. Solid materials, including pigments and/or metallic flakes, may be suspended in the binder solution up to an equal amount by weight relative to the weight of the binder solids, i.e., the polymer plus the amine-formaldehyde resin.

In addition to the binder mixture and solid materials, coating compositions in accordance with the invention may contain minor amounts of additional components which are conventional in the art, such as slip agents, lubricants, UV absorbers, wetting agents, dispersing agents, anti-settling agents, thixotropic agents, inhibitors, catalysts, etc.

As one method of forming coating compositions in accordance with the invention, the polymer(s), amine-formaldehyde resin(s) and organic solvent(s) are mixed together to form a clear mixture. Then solid particulates and other additives are added and mixed together to form a suspension.

Water is generally not added until at or close to the time of application to a substrate surface. The amount of water required will depend upon the unthinned viscosity of a specific coating composition and the viscosity appropriate for applying the coating composition. For spray application it is desirable to have a thinned viscosity of less than about 250 cps. Typically, the volume of water added is between about one-fifth to twice the volume of the coating composition. The water may be added by batch mixing, or an intermix system employing either static or mechanical intermixing.

To achieve rapid curing of the coating composition once applied to a surface, an acidic curing catalyst is generally used. To avoid premature curing, the curing catalyst is generally added at the site of application, e.g., by prior mixture with the water. Blocked acidic curing catalysts might be incorporated in the coating composition; however, to ensure against premature curing, it is preferred to add any curing catalyst at the site of application. Suitable acidic curing agents include but are not limited to paratoluenesulfonic acid, maleic acid oxalic acid, fumaric acid, various substituted sulfonic acids, various substituted phosphoric acids, etc.

Coating compositions according to the present invention may be applied by any conventional manner. Generally, it is contemplated that the coating compositions will be applied by a spray method. After application, curing is promoted by elevated temperatures, e.g., by baking at temperatures of about 80° C. to about 120° C. or higher.

The coating provided by the composition may be used alone, particularly for interior applications, e.g., interior automotive parts. Where greater weatherability is desired, e.g., for exterior automotive parts, a clear top coat may be applied over the coat formed from the coating compositions. Examples of automotive approved top coats are Pittsburg Topcoat UCC-2000 and Bee Chemical Topcoat Q66291.

Compositions according to the invention are applicable to a variety of substrate surfaces such as bare steel, primed metal and a variety of polymeric surfaces tolerant to baking temperatures such as TPU (Thermoplastic Urethane) and RIM (Reaction Injection Molded Urethane).

The invention will now be described in greater detail by way of specific examples;

EXAMPLE 1

A composition was prepared consisting of the following components expressed as parts by weight: 65.0 parts Olin Chemical PPC-T1000, polyether polyol (a triol with theoretical MW=1000 and theoretical OH value=168); 35.0 parts American Cyanamid Cymel 303, melamine-formaldehyde resin; 0.5 parts Dow Paint Additive #57; 20.0 parts isopropyl alcohol; 20.0 parts Silberline 5245AR, aluminum paste. After simple stirring this yielded 140.5 parts of a homogenous "silver" paint.

EXAMPLE 2

A paint thinner was prepared consisting of the following components expressed as parts by weight: 0.5 parts paratoluenesulfonic acid dissolved in 99.5 parts water.

EXAMPLE 3

140.5 parts of the paint prepared in EXAMPLE 1 were thinned with 100.0 parts of the thinner prepared in EXAMPLE 2 and applied by air-atomized spray at about 50 psig to a standard automotive test panel (Bonderite 40 steel primed with "E-Coat" electrodepositon primer). After baking for 30 minutes at 250° F. the paint was found to cure and have "SCOTCH-TAPE" adhesion over a cross-hatched area.

EXAMPLE 4

A composition was prepared consisting of the following components expressed as parts by weight: 65.0 parts Olin Chemical PPC-T1000, polyether polyol (a triol with theoretical MW=1000 and theoretical OH value=168); 35.0 parts American Cyanamid Cymel 303, melamine-formaldehyde resin; 0.5 parts Dow Paint Additive #57; 20.0 parts isopropyl alcohol; 1.5 parts General Aniline & Film Gafac RE877, a wetting additive; 80.0 parts DuPont R960, titanium dioxide pigment. This composition was dispersed using a sand-mill to yield 202.0 parts of a homogeneous "white" paint.

EXAMPLE 5

A paint thinner was prepared consisting of the following oomponents expressed as parts by weight: 0.5 parts paratoluenesulfonic acid dissolved in 49.5 parts water.

EXAMPLE 6

202.0 parts of the paint prepared in EXAMPLE 4 were thinned with 50.0 parts of the thinner prepared in EXAMPLE 5 and applied by air-atomized spray at about 50 psig to a standard automotive test panel (Bonderite 40 steel primed with "E-Coat" electrodeposition Primer). After baking for 30 minutes at 250° F. the paint was found to cure and have "SCOTCH-TAPE" adhesion over a cross-hatched area.

EXAMPLE 7

A composition was prepared consisting of the following components expressed as parts by weight: 65.0 parts Union Carbide PPG-425, polyether polyol (a diol with theoretical MW=425 and theoretical OH value=264); 35.0 parts American Cyanamid Cymel 303, melamine-formaldehyde resin; 0.5 parts Dow Paint Additive #57; 20.0 parts isopropyl alcohol; 20.0 parts Silberline 5245AR, aluminum paste. After simple stirring this yielded 140.5 parts of a homogeneous "silver" paint.

EXAMPLE 8

140.5 parts of the paint prepared in EXAMPLE 7 were thinned with 100.0 parts of the thinner prepared in EXAMPLE 2 and applied by air-atomized spray at about 50 psig to a standard automotive test panel (Bonderite 40 steel primed With "E-Coat" electrodepositon primer). After baking for 30 minutes at 250° F. the paint was found to cure and have "SCOTCH-TAPE" adhesion over a cross-hatched area.

EXAMPLE 9

A composition was prepared consisting of the following components expressed as parts by weight: 65.0 parts Union Carbide PPG-425, polyether polyol (a diol with theoretical MW=425 and theoretical OH value=264); 35.0 parts American Cyanamid Cymel 303, melamine-formaldehyde resin; 0.5 parts Dow Paint Additive #57; 20.0 parts isopropyl alcohol; 1.5 parts General Aniline & Film Gafac RE877, a wetting additive; 80.0 parts DuPont R960, titanium dioxide pigment. This composition was dispersed using a sand-mill to yield 202.0 parts of a homogeneous "white" paint.

EXAMPLE 10

202.0 parts of the paint prepared in EXAMPLE 9 were thinned with 50.0 parts of the thinner prepared in EXAMPLE 5 and applied by air-atomized spray at about 50 psig to a standard automotive test panel (Bonderite 40 steel primed with "E-Coat" electrodepositon primer). After baking for 30 minutes at 250° F. the paint was found to cure and have "SCOTCH-TAPE" adhesion over a cross-hatched area.

EXAMPLE 11

A composition was prepared consisting of the following components expressed as parts by weight: 65.0 parts Union Carbide PPG-425, polyether polyol (a diol with theoretical MW=425 and theoretical OH value=264); 35.0 parts American Cyanamid Cymel 303, melamine-formaldehyde resin; 0.5 parts Dow Paint Additive #57; 20.0 parts Silberline 5245AR, aluminum paste. After simple stirring this yielded 120.5 parts of a homogeneous "silver" paint. Apparent viscosity was sufficiently low without necessity for addition of organic solvent.

EXAMPLE 12

120.5 parts of the paint prepared in EXAMPLE 11 were thinned with 100.0 parts of the tinner prepared in EXAMPLE 2 and applied by air-atomized spray at about 50 psig to a standard automotive test panel (Bonderite 40 steel primed with "E-Coat" electrodepositon primer). After baking for 30 minutes at 250° F. the paint was found to cure and have "SCOTCH-TAPE" adhesion over a cross-hatched area.

EXAMPLE 13

A composition was prepared consisting of the following components expressed as parts by weight: 65.0 parts triethylene glycol (a diol with theoretical MW=150 and theoretical OH value=748); 35.0 parts American Cyanamid Cymel 303, melamine-formaldehyde resin; 0.5 parts Dow Paint Additive #57; 20.0 parts Silberline 5245AR, aluminum paste. After simple stirring this yielded 120.5 parts of a homogeneous "silver" paint

EXAMPLE 14

140.5 parts of the paint prepared in EXAMPLE 13 were thinned with 100.0 parts of the thinner prepared in EXAMPLE 2 and applied by air-atomized spray at about 50 psig to a standard automotive test Panel (Bonderite 40 steel primed with "E-Coat" electrodeposition Primer). After baking for 30 minutes at 250° F. the paint was found to cure and have "scotch-tape" adhesion over a cross-hatched area. Some fuming was observed during baking.

EXAMPLE 15

A composition was prepared consisting of the following components expressed as parts by weight: 65.0 parts triethylene glycol (a diol with theoretical MW=150 and theoretical OH value=748); 35.0 parts American Cyanamid Cymel 303, melamine-formaldehyde resin; 0.5 parts Dow Paint Additive #57; 20.0 parts isopropyl alcohol; 1.5 parts General Aniline & Film Cafac RE877, a wetting additive; 80.0 parts DuPont R960, titanium dioxide pigment. This composition was dispersed using a sand-mill to yield 202.0 parts of a homogeneous "white" paint.

EXAMPLE 16

202.0 parts of the paint prepared in EXAMPLE 15 were thinned with 50.0 parts of the thinner prepared in EXAMPLE 5 and applied by air-atomized spray at about: 50 psig to a standard automotive test panel (Bonderite 40 steel primed with "E-Coat" electrodeposition primer). After baking for 30 minutes at 250° F. the paint was found to cure and have "SCOTCH-TAPE" adhesion over a cross-hatched area. Some fuming was observed during baking.

EXAMPLE 17

A composition was prepared consisting of the following components expressed as parts by weight: 12.74 parts polyester resin prepared from 2 moles PEG-300 per 1 mole adipic acid (theoretical MW=710 and theoretical OH value=158); 27.82 parts Monsanto Resimene 745, melamine-formaldehyde resin; 25.52 parts PEC-400, polyethylene glycol; 3.48 parts Hercules Klucel E, hydroxypropyl cellulose flow control additive; 1.00 Parts Dow Chemical Paint additive #57; 16.98 parts isopropyl alcohol; 0.96 parts American Cyanamid Catalyst 4040; 12.00 parts Silberline 5245 AR. aluminum paste. After simple stirring this yielded 100.50 parts of a homogeneous "silver" paint.

100.50 parts of this silver paint was then thinned with 80.0 parts of water and applied by air-atomized spray at about 50 psig to a standard automotive test panel (Bonderite 40 steel primed with "E-Coat" electrodeposition primer). After baking for 30 minutes at 250° F. the paint was found to cure and have "SCOTCH-TAPE" adhesion over a cross-hatched area.

EXAMPLE 18

A composition was prepared consisting of the following components expressed as parts by weight 17.39 parts of polyester resin prepared from 2 moles triethylene glycol per 1 mole adipic acid (theoretical MW=410 and theoretical OH value=274); 13.91 parts American Cyanamid Cymel 303, melamine-formaldehyde resin; 34.78 parts PEG 400, polyethylene glycol; 3.48 parts Hercules Klucel E, hydroxypropyl cellulose flow control additive; 1.00 parts Dow Chemical Paint Additive #57; 16.98 parts isopropyl alcohol, 1.92 parts of a "blocked" acid catalyst (0.96 parts Catalyst 4040 plus 0.24 parts dimethylaminoethanol plus 0.96 parts isopropyl alcohol); 10.00 parts Silberline 5245 AR, aluminum paste. After simple stirring this yielded 99.46 parts of a homogeneous "silver" paint.

99.46 parts of this silver paint was then thinned with 80.0 parts of water and applied by air-atomized spray at about 50 psig to a standard automotive test panel (Bonderite 40 steel primed with "E-Coat" electrodeposition primer). After baking for 30 minutes at 250° F. the paint was found to cure and have "scotch-tape" adhesion over a cross-hatched area.

EXAMPLE 19

A composition was prepared consisting of the following components expressed as parts by weight: 65.0 parts Ruco Rucoflex LB-651, polyester polyol (a triol with theoretical MW=1000 and theoretical OH value=525); 35.0 parts American Cyanamid Cymel 303, melamine-formaldehyde resin; 0.5 parts Dow Paint Additive #57; 20.0 parts isopropyl alcohol; 20.0 parts Silberline 5245AR, aluminum paste. After simple stirring this yielded 140.5 parts of a homogeneous "silver" paint.

EXAMPLE 20

140.5 parts of the paint prepared in EXAMPLE 19 were thinned with 100.0 parts of the thinner prepared in EXAMPLE 2 and applied by air-atomized spray at about 50 psig to a standard automotive test panel (Bonderite 40 steel primed with "E-Coat" electrodepositon primer). After baking for 30 minutes at 250° F. the paint was found to cure and have "SCOTCH-TAPE" adhesion over a cross-hatched area.

EXAMPLE 21

A composition was prepared consisting of the following components expressed as parts by weight: 65.0 parts Ruco Rucoflex LB-651, polyester polyol (a triol with theoretical MW=1000 and theoretical OH value=525); 35.0 parts American Cyanamid Cymel 303, melamine-formaldehyde resin; 0.5 parts Dow Paint Additive #57; 20 0 parts isopropyl alcohol; 1.5 parts General Aniline & Film Gafac RE877, a wetting additive; 80.0 parts DuPont R960, titanium dioxide pigment This composition was dispersed using a sand-mill to yield 202.0 parts of a homogeneous "white" paint with a viscosity of 900 cps as measured with a Brookfield viscosimeter using a #3 spindle at 100 rpm.

EXAMPLE 22

202.0 parts of the paint prepared in EXAMPLE 21 were thinned with 50.0 parts of the thinner prepared in EXAMPLE 5 and applied by air-atomized spray at about 50 psig to a standard automotive test panel (Bonderite 40 steel primed with "E-Coat" electrodeposition primer). After baking for 30 minutes at 250° F. The paint was found to cure and have "scotch-tape" adhesion over a cross-hatched area. The viscosity of the thinned paint was 180 cps as measured with a Brookfield Viscosimeter using a #2 spindle at 100 rpm

EXAMPLE 23

A composition was prepared consisting of the following components expressed as parts by weight: 80 0 parts Olin Chemical PPG-T1000, polyether polyol (a trio With theoretical MW=1000 and theoretical OH value=168); 20.0 parts American Cyanamid Cymel 303. melamine-formaldehyde resin; 0.5 parts Dow Paint Additive #57; 20.0 parts isopropyl alcohol; 20.0 parts Silberline 5245AR, aluminum paste. After simple stirring this yielded 140.5 parts of a homogeneous "silver" paint.

EXAMPLE 24

140.5 parts of the paint prepared in EXAMPLE 23 were thinned with 100.0 parts of the thinner prepared in EXAMPLE 2 and applied by air-atomized spray at about 50 psig to a standard automotive test panel (Bonderite 40 steel primed with "E-Coat" electrodepositon primer). After baking for 30 minutes at 250° F. the paint was found to cure and have "SCOTCH-TAPE" adhesion over a cross-hatched area.

EXAMPLE 25

A composition was prepared consisting of the following components expressed as parts by weight: 20.0 parts Olin Chemical PPG-T1000, polyether polyol (a triol with theoretical MW=1000 and theoretical OH value=168); 80.0 parts American Cyanamid Cymel 303 melamine-formaldehyde resin; 0.5 parts Dow Paint Additive #57; 20.0 parts isopropyl alcohol; 20.0 parts Silberline 5245AR, aluminum Paste. After simple stirring this yielded 140 5 parts of a homogeneous "silver" paint.

EXAMPLE 26

140.5 parts of the paint prepared in EXAMPLE 25 were thinned with 100.0 parts of the thinner prepared in EXAMPLE 2 and applied by air-atomized spray at about 50 psig to a standard automotive test panel (Bonderite 40 steel primed with "E-Coat" electrodeposition primer). After baking for 30 minutes at 250° F. the paint was found to cure and have "SCOTCH-TAPE" adhesion over a cross-hatched area.

EXAMPLE 27

A composition was prepared consisting of the following components expressed as parts by weight: 65.0 parts Olin Chemical PPG-T1000, polyether polyol (a triol with theoretical MW=1000 and theoretical OH value=168); 35.0 parts American Cyanamid Cymel 303, melamine-formaldehyde resin; 0.5 parts Dow Paint Additive #57; 20.0 parts dipropylene glycol monomethyl ether; 20.0 parts Silberline 5245AR, aluminum paste. After simple stirring this yielded 140.5 parts of a homogeneous "silver" paint.

EXAMPLE 28

140.5 parts of the paint prepared in EXAMPLE 27 were thinned with 100.0 parts of the thinner prepared in EXAMPLE 2 and applied by air-atomized spray at about 50 psig to a standard automotive test panel (Bonderite 40 steel primed with "E-Coat" electrodepositon primer). After baking for 30 minutes at 250° F. the paint was found to cure and have "SCOTCH-TAPE" adhesion over a cross-hatched area.

EXAMPLE 29

A composition was prepared consisting of the following components expressed as parts by weight: 65.0 parts Olin Chemical PPG-T1000, polyether polyol (a triol with theoretical MW=1000 and theoretical OH value=168); 35.0 parts Cargill Melamine 2387, melamine-formaldehyde resin; 0.5 parts Dow Paint Additive #57; 20.0 parts isopropyl alcohol; 20.0 parts Silberline 5245AR, aluminum paste. After simple stirring this yielded 140.5 parts of a homogeneous "silver" paint.

EXAMPLE 30

140.5 parts of the paint prepared in EXAMPLE 29 were thinned with 100.0 parts of the thinner prepared in EXAMPLE 2 and applied by air-atomized spray at about 50 psig to a standard automotive test panel (Bonderite 40 steel primed with "E-Coat" electrodepositon primer). After baking for 30 minutes at 250° F. the paint was found to cure and have "SCOTCH-TAPE" adhesion over a cross-hatched area.

EXAMPLE 31

A composition was prepared consisting of the following components expressed as parts by weight: 65.0 parts Olin Chemical PPG-T1000, polyether polyol (a triol with theoretical MW=1000 and theoretical OH value=168); 35.0 parts American Cyanamid Beetle 80, urea-formaldehyde resin; 0.5 parts Dow Paint Additive #57; 20.0 parts isopropyl alcohol; 20.0 parts Silberline 5245AR, aluminum paste. After simple stirring this yielded 140.5 parts of a homogeneous "silver" paint.

EXAMPLE 32

140.5 parts of the paint prepared in EXAMPLE 31 were thinned with 100.0 parts of the thinner prepared in EXAMPLE 2 MW =1000 and theoretical OH value =168); 35.0 parts American and applied by air-atomized spray at about 50 psig to a standard automotive test panel (Bonderite 40 steel Primed with "E-Coat" electrodepositon primer). After baking for 30 minutes at 250° F. the paint was found to cure and have "SCOTCH-TAPE" adhesion over a cross-hatched area.

EXAMPLE 33

A composition was prepared consisting of the following components expressed as parts by weight: 65.0 parts Olin Chemical PPG-T1000, polyether polyol (a triol with theoretical MW=1000 and theoretical OH value=168); 35.0 parts American Cyanamid Cymel 303, melamine-formaldehyde resin; 0.5 parts Dow Paint Additive #57; 20.0 parts isopropyl alcohol; 20.0 parts Silberline 5245AR, aluminum paste; 0.5 parts paratoluenesulfonic acid. After simple stirring this yielded 141.0 parts of a homogeneous "silver" paint.

EXAMPLE 34

141.0 parts of the paint prepared in EXAMPLE 33 were thinned with 100.0 parts of water and applied by air-atomized spray at about 50 psig to a standard automotive test panel (Bonderite 40 steel primed with "E-Coat" electrodepositon primer). After baking for 30 minutes at 250° F. the paint was found to cure and have "SCOTCH-TAPE" adhesion over a cross-hatched area.

EXAMPLE 35

A composition was prepared consisting of the following components expressed as parts by weight: 65.0 parts Olin Chemical PPC-T1000, polyether polyol (a triol with theoretical MW=1000 and theoretical OH value=168); 35.0 parts American Cyanamid Cymel 303, melamine-formaldehyde resin; 0.5 parts Dow Paint Additive #57; 20.0 parts isopropyl alcohol; 20.0 parts Silberline 5245AR, aluminum paste; 0.5 parts paratoluenesulfonic acid "blocked" with 0.27 parts dimethylaminoethanol. After simple stirring this yielded 141.27 parts of a homogeneous "silver" paint.

EXAMPLE 36

141.27 parts of the paint prepared in EXAMPLE 33 were thinned with 100.0 parts of water and applied by air-atomized spray at about 50 psig to a standard automotive test panel (Bonderite 40 steel primed with "E-Coat" electrodepositon primer). After baking for 30 minutes at 250° F. the paint was found to cure and have "SCOTCH-TAPE" adhesion over a cross-hatched area.

EXAMPLE 37

140.5 parts of the paint prepared in EXAMPLE 1 were thinned with 100.0 parts of the thinner prepared in EXAMPLE 2 and applied by air-atomized spray at about 50 psig to three additional substrates: bare steel, TPU (Thermoplastic Urethane) and RIM (Reaction Injection Molded Urethane). After baking for 30 minutes at 250° F. the paint was found to cure and have "SCOTCH-TAPE" adhesion over a cross-hatched area of each of the three different substrates.

EXAMPLE 38

140.5 parts of the paint prepared in EXAMPLE 1 were thinned with 100.0 parts of the thinner prepared in EXAMPLE 2 and applied by air-atomized spray at about 50 psig to a standard automotive test panel (Bonderite 40 steel primed with "E-Coat" electrodepositon primer). After force-drying for 3 minutes at 250° F. a clear "one Pack" automotive approved topcoat was applied by spray. The topcoat was Pittsburg Topcoat UCC-2000 thinned to 25 seconds on a #2 Zahn cup with a thinner consisting of a 50/50 mixture of xylol and methyl n-Amyl ketone. After an additional baking for 30 minutes at 250° F. the combination of coatings was found to have "SCOTCH-TAPE" adhesion over a cross-hatched area. adhesion over a cross-hatched area.

EXAMPLE 39

140.5 parts of the paint prepared in EXAMPLE 1 were thinned with 100.0 parts of the thinner prepared in EXAMPLE 2 and applied by air-atomized spray at about 50 psig to a standard automotive test panel (Bonderite 40 steel primed with "E-Coat" electrodepositon primer). After force-drying for 3 minutes at 250° F. a clear "two pack" Automotive approved topcoat was applied by spray. The topcoat consisted of 88 parts by weight of Bee Chemical Topcoat Q-66291 mixed with 12 parts by weight of Bee Chemical Catalyst C-775. After an additional baking for 30 minutes at 250° F. the combination of coatings was found to have "SCOTCH-TAPE" adhesion over a cross-hatched area. adhesion over a cross-hatched area.

While the invention has been described in terms of certain preferred embodiments, modifications obvious to one with ordinary skill in the art may be made without departing from the scope of the present invention.

Various features of the invention are set forth in the following claims:

What is claimed is:

1. A clear, homogeneous coating binder solution comprising:
   I. an organic component binder mixture comprising
      (A) between about 25 and about 95 wt. percent of a polymer which is a polyether or has both ether and ester linkages, said polymer having an acid number below about 15 and an hydroxyl value in the range of between about 100 to about 1000,
      (B) between about 2.5 and about 50 wt. percent of an amine-formaldehyde resin, and
      (C) up to about 50 wt. percent of an organic solvent;
   said components (A), (B), and (C) being mutually compatible so as to form a clear, homogeneous organic component binder mixture in the absence of water; said organic component binder mixture being sufficiently compatible with a volume of water equal to at least about one fifth the total volume of said organic component binder mixture and with sufficient additional water to achieve a thinned viscosity of less than about 250 cps so as to remain a clear homogeneous solution, plus
   II. a volume of water equal to at least about one fifth the volume of said organic component binder mixture plus sufficient additional water to achieve a thinned viscosity of less than about 250 cps.

2. A binder solution according to claim 1 which said organic component binder mixture has a Brookfield viscosity at 25° C. of about 20,000 cps or less.

3. A binder solution according to claim 1 wherein said polymer is a polyether polyol derived from the groups consisting of ethylene oxide, propylene oxide and mixtures thereof.

4. A binder solution according to claim 1 wherein said polymer has both ether and ester linkages and is derived from polyethylene glycol and polyfunctional carboxylic acids.

5. A binder solution according to claim 4 wherein said polymer is derived from polyethylene glycol and adipic acid.

6. A binder solution according to claim 1 wherein aid amine-formaldehyde resin is selected from the groups consisting of melamine-formaldehyde resins, urea-formaldehyde resins and mixtures thereof.

7. A binder solution according to claim 1 wherein said amine-formaldehyde resin is hexamethoxymethyl melamine.

8. A binder solution according to claim 1 wherein said organic solvent is selected from the group consisting of methanol, ethanol, propanol, isopropanol, ethylene glycol-monomethyl ether, ethylene glycol-monoethyl ether, ethylene glycol monoisopropyl ether, ethylene glycol monobutyl ether, diethylene glycol monomethyl ether, diethylene glycol monoethyl ether, diethylene glycol monopropyl ether, diethylene glycol monobutyl ether, acetone and mixtures thereof.

9. A binder solution according to claim 1 wherein said polymer has an hydroxyl value of between about 100 and about 600.

10. A binder solution according to claim 1 plus a cure catalyst for said resin (B).

11. A binder solution according to claim 10 wherein said cure catalyst is provided separately from said organic component binder mixture for admixture thereto at the site of application.

12. A coating composition comprising:
    (I) a clear, homogeneous organic component binder mixture comprising:
       (A) between about 25 and about 95 wt. percent of a polymer which is a polyether or has both ether and ester linkages, said polymer having an acid number below about 15 and an hydroxyl value in the range of between about 100 to about 1000,
       (B) between about 2.5 and about 50 wt. percent of an amine-formaldehyde resin, and
       (C) up to about 50 wt. percent of an organic solvent;
    said components (A), (B), and (C) being sufficiently compatible with a volume of water equal to at least about one fifth the total volume of said organic component binder mixture and with sufficient additional water to achieve a thinned viscosity of less than about 250 cps so as to remain a clear, homogeneous solution; and (II) suspended water-sensitive solid particulates at a weight level up to equal to that of the total weight of said polymer (A) plus said resin (B),
    said coating composition being free of water, yet reducible with water.

13. A composition according to claim 12 wherein said binder mixture has a Brookfield viscosity at 25° C. of about 20,000 cps or less.

14. A composition according to claim 12 wherein said polymer is a polyether polyol derived from the group consisting of ethylene oxide, propylene oxide and mixtures thereof.

15. A composition according to claim 12 wherein said polymer has both ether and ester linkages and is derived from polyethylene glycol and polyfunctional carboxylic acids.

16. A composition according to claim 15 wherein said polymer is derived from polyethylene glycol and adipic acid.

17. A composition according to claim 12 wherein said amine-formaldehyde resin is selected from the group consisting of melamine-formaldehyde resins, urea-formaldehyde resins and mixtures thereof.

18. A composition according to claim 12 wherein said amine-formaldehyde resin is hexamethoymethyl melamine.

19. A composition according to claim 12 wherein said organic solvent is selected from the group consisting of methanol, ethanol, propanol, isopropanol, ethylene glycol-monomethyl ether, ethylene glycol-monoethyl ether, ethylene glycol monoisopropyl ether, ethylene glycol monobutyl ether, diethylene glycol monomethyl ether, diethylene glycol monoethyl ether, diethylene glycol monopropyl ether, diethylene glycol monobutyl ether, acetone and mixtures thereof.

20. A composition according to claim 12 wherein said polymer has an hydroxyl value of between about 100 about 600.

21. A composition according to claim 12 plus a cure catalyst for said resin (B).

22. A composition according to claim 21 wherein said cure catalyst is provided separately from said composition for admixture thereto at the site of application.

23. A coating composition according to claim 12 wherein said water - sensitive solid particulates are metal.

24. A coating composition according to claim 12 wherein said water - sensitive solid particulates are aluminum.

* * * * *